United States Patent

[11] 3,554,226

[72] Inventors John F. W. Robbins
 Los Altos, Calif.;
[21] Appl. No. 814,546
[22] Filed Apr. 9, 1969
[45] Patented Jan. 12, 1971
[73] Assignees Beckman Instruments, Inc.
 a corporation of California;

[54] VALVING FOR A STOPPED FLOW CELL
 3 Claims, 3 Drawing Figs.
[52] U.S. Cl. .................................................. 137/559,
 137/567
[51] Int. Cl. ..................................................F16k 37/00,
[50] Field of Search......................................... 137/559,
 567

[56] References Cited
UNITED STATES PATENTS
2,835,323 5/1958 Booth............................ 137/567
3,038,495 6/1962 Fortin............................ 137/559

Primary Examiner—Henry T. Klinksiek
Attorneys—Flehr, Hohbach, Test, Albritton and Herbert ABSTRACT: A valving device for a stopped flow kinetic system employing reactant reservoirs for filling drive cylinders, which cylinders force reactants through a mixer and into an observation cell. The valving device includes a pair of check valves, such as ball check valves, one interposed between the reservoirs and drive cylinders and the other interposed between the drive cylinders and the mixer. Responsive to reactant fluid pressure, the valving device permits reactants to flow from the reservoirs to the drive cylinders and, in turn, to the mixer while stopping backflow from the mixer to drive cylinders and from the drive cylinders to the reservoirs.

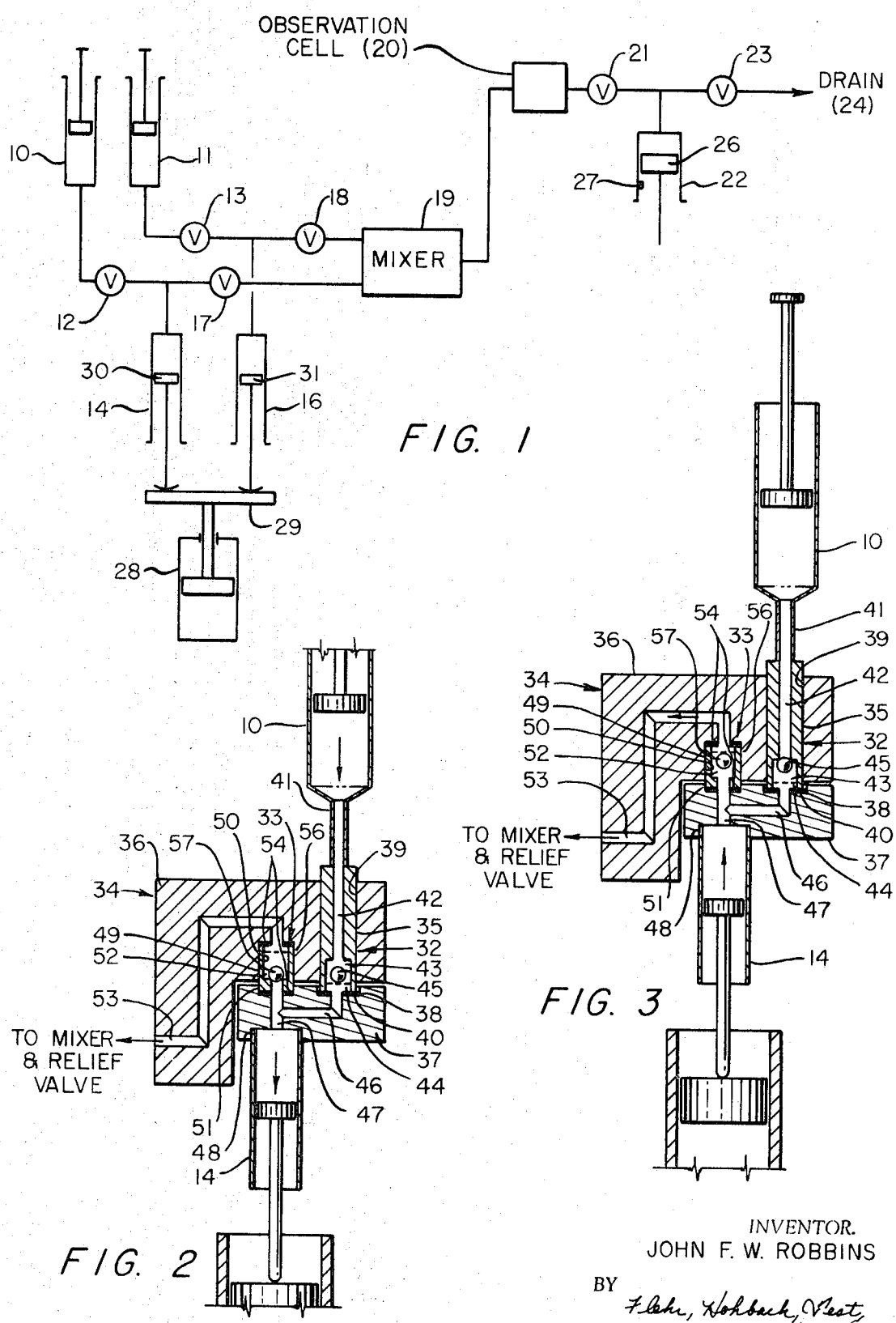

VALVING FOR A STOPPED FLOW CELL

BACKGROUND OF THE INVENTION

Stopped flow apparatus serving to fill an observation cell with fluid reactants which have just been rapidly mixed are useful in kinetic experiments. In one such apparatus the reactants are transferred from a plurality of reservoir syringes to corresponding driving cylinders. When rapid mixing for a kinetic determination is desired, the plungers of the driving cylinders are forced into the cylinders to send a predetermined quantity of reactants through a mixer and an observation cell. After passing through the cell, the mixed reactants proceed to a stopping cylinder and force the piston thereof against a preset stop, thus terminating reactant flow. One valving system used for the driving cylinders includes a manually-operated slide valve movable to two positions. In a first position, used for filling the driving cylinder, a first valve between the reservoir syringe and the driving cylinder is opened while a second valve between the driving cylinder and the mixer is closed. During a kinetic determination, the first valve is closed and the second valve is opened and the piston of the driving cylinder forces the reactant to flow to the mixer.

In one construction of the above manually-operated slide valve, a spindle having a number of O-rings thereon is inserted into a bore in a block, which bore includes machined recesses. When an opened valve position is desired, the spindle is moved through the bore until the O-rings are set within the recesses, and when a closed valve position is desired, the O-rings mate with the bore to form a seal.

One deficiency of such valves is the requirement for machined bores of close tolerances to avoid binding of the O-rings sliding in the bore. In addition, costly recesses in the bores are necessary for the open position of the valves.

A further deficiency of such a valve is the requirement for manual operation thereof for each filling operation.

Another deficiency of such valve lies in the use of O-ring seals which wear out and must be periodically replaced. Small quantities of reactant trapped in the O-ring grooves and in the clearances around the valve shaft may only be removed by dismantling the assembly and flushing out the passages.

SUMMARY OF THE INVENTION AND OBJECTS

In accordance with the invention, a valving system for a stopped flow cell is provided. The stopped flow cell includes a plurality of reactant reservoirs each connected to one of a plurality of reactant drive cylinders for driving predetermined quantities of reactants through a mixer into an observation cell. The stopped flow cell further includes a device serving to allow a predetermined volume of mixed reactant to flow through the cell and for instantaneously stopping further flow. A pair of one-way check valves, preferably ball check valves, controls reactant flow to the mixer. The first check valve permits reactant flow toward the drive cylinders while stopping reactant flow toward the reservoir, the stoppage being responsive to the fluid pressure of reactant in the direction of the reservoir. The second valve permits reactant flow toward the mixer responsive to fluid pressure in that direction and stops reactant flow toward the drive cylinder.

It is an object of the invention to provide a stopped flow cell with an improved valving device in comparison to valving devices which have been used.

It is a further object of the invention to provide a valving device for a stopped flow cell which is relatively simple to machine and to replace if damaged in operation.

It is a further object of the invention to provide a valving device for a stopped flow cell that reduces the areas in which fluids can be trapped. It is a further object of the invention to simplify the operation of a stopped flow cell by eliminating a manual valving operation.

It is a further object of the invention to provide a stopped flow cell which operates in a repeatable manner with a minimum amount of reagent flushing.

Further objects of the invention will be apparent from the following description with reference to the drawing appended thereto.

BRIEF DESCRIPTION OF THE DRAWING

FIG. 1 is a schematic diagram of the operation of an apparatus incorporating the valving device of the invention.

FIG. 2 and 3 are enlarged views of the valving device of the invention with the values in two different positions.

DESCRIPTION OF THE PREFERRED EMBODIMENT

Referring to FIG. 1, first and second liquid reactants are placed in reservoir cylinders 10 and 11, respectively, from which they are transferred through valves 12 and 13, respectively, to reactant driving cylinders 14 and 16, respectively, through valves 17 and 18, respectively, and to mixer 19. The mixed reactants flow from mixer 19 to observation cell 20, through valve 21 into stopping cylinder 22 and then to drain valve 23 and drain 24.

Before sending reactants through cell 20 for a kinetic determination, hereinafter called the operating step, stopping cylinder 22 is adjusted to permit only a selected quantity of mixed reactants to flow. This may be accomplished by positioning a piston arm 26 a predetermined distance from piston stop 27 so that, with valve 23 closed and valve 21 open, reactants are allowed to flow until piston 26 reaches stop 27.

Driving cylinders 14 and 16 are supplied with reactants from reservoirs 10 and 11 in a "filling step" prior to the operating step. During the filling step, valve 21 is closed and pistons 30 and 31 are forced outwardly of cylinders 14 and 16 by the reactants flowing into the cylinders. This movement of the pistons is translated to a hydraulically operated cylinder 28, not under pressure during the filling step, by connecting bar 29.

During the operating step, valve 21 is opened while valve 23 is closed and hydraulic pressure is applied to power cylinder 28 to force pistons 30 and 31 into the cylinders 14 and 16 to drive the reactants into the mixer 19, through cell 20 and into cylinder 22. In cylinder 22, piston 26 is driven outwardly of the cylinder until stop 27 is contacted, thus preventing further reactant flow. The change is optical density of the mixed reactants in cell 20 at the instant of stopped flow may be viewed on an oscilloscope (not shown).

As the apparatus prior to mixer 19 through which the first and second reactants flow is identical, for convenience only the working parts of the valving device for the first reactant is shown in FIGS. 2 and 3. Valves 12 and 17, schematically represented in FIG. 1, may be comprised of cooperating ball check valve assemblies 32 and 33 as shown in FIGS. 2 and 3. A two-piece block or body 34, including an upper portion 36 and a lower portion 37, serves to carry the valve assemblies. A well 38 in member 37 cooperates with a bore 39 in member 36 to provide an opening for slidably receiving housing 35 of assembly 32. Housing 35 is suitably secured in member 36 by a threading engagement between the upper portion of the housing and member 36. Housing 35 contains an axial passage 42 having a tapered fitting adapter at the top thereof. Passage 42 is interconnected with reservoir 10 by tube 41 forming a seal with the adapter. A cylindrical chamber is formed within housing 35, having a cage 44 secured across a lower portion of the cylindrical wall thereof. Cage 44 permits free flow of fluids therethrough while limiting movement of ball 45. Ball 45 is disposed within chamber 43 above cage 44. Chamber 43 communicates at one end with passage 42 and at the other end with channel 46 disposed within member 37. A suitable seal between channel 46 and chamber 43 is formed by externally clamping the top of member 36 and the bottom of member 37 (by means not shown) to force the bottom of housing 35 against washer 40. A small space is left between members 36 and 37 to allow for the forced seal against washer 40. The washer is suitably formed from an inert material, such as Teflon.

Channel 46 communicates at its other end with a central portion of passage 47 disposed in member 37. Passage 47, in turn, communicates at one end with cylinder 14 which is suitably urged into seat 48 of member 37 by a ring nut (not shown) to seal the connection between the passage and the cylinder.

During the operating step, the fluid pressure of any reactant flowing toward reservoir 10 from cylinder 14 thrusts ball 45 against the opening to passage 42. Since the opening is smaller than the diameter of the ball, reactant flow is thereby stopped. On the other hand, reactant flows freely past cage 44 in either direction.

Assembly 33 includes a housing 49 which is slidably received by an opening in block portion 34 formed by cooperating bore 50 of member 36 and well 51 of member 37. The other end of passage 47 extends into housing 49 to communicate with chamber 52 formed therein. Chamber 52 communicates at its other end with passage 53 disposed in member 36. Suitable top and bottom washer seals 54 above and below the chamber are provided to prevent leakage therefrom. The washers may be formed of inert material, such as Teflon. The clamp for members 36 and 37 (not shown) urge the members toward each other compressing the washers in a force seal. To maintain the force seal, members 36 and 37 do not contact in the area of the bottom washer. Cage 56, including holes for flow therethrough, is secured across the upper cylindrical wall of chamber 52. Ball 57 is disposed within chamber 52 below cage 56 and serves to block reactant flow through valve assembly 33 toward drive cylinder 14. The flow blockage occurs when ball 57, of a larger diameter than passage 47, is forced against the passage opening responsive to fluid pressure in that direction. One cause for such pressure would be the filling of driving cylinders 14 and 16 at different times. Valve 33 is also gravity aided to stop flow. On the other hand, reactant fluid flowing toward mixer 19 is allowed to pass unobstructed through passage 53 to mixer 19.

Referring to FIG. 2, which shows valve assemblies 32 and 33 in position for a filling of the first reactant, ball 45 is seated on cage 44 permitting the reactant to flow freely thereby. While drive cylinder 14 is being filled, reactant flow into valve assembly 33 forces ball 57 against cage 56 permitting free flow through passage 53 into mixer 19 and observation cell 20. In a similar manner the second reactant flows from reservoir 11 to the mixer. Backflow from mixer 19 to driving cylinder 14 must be avoided to avoid contamination of the reactants therein. Backflow is prevented by ball 57 of valve assembly 33 blocking passage 47 in response to fluid pressure in that direction and further aided by gravity. Backflow from mixer 19 to driving cylinder 16 is prevented in a similar manner.

The position of valve assemblies 32 and 33 during the operating step are shown in FIG. 3. In valve assembly 32, ball 45 closes passage 42 to stop backflow to reservoir 10 responsive to the fluid pressure of the reactant in channel 46 caused by driving cylinder 14. On the other hand, the reactant is permitted to pass freely to mixer 19 through valve assembly 33 wherein ball 57 is urged against cage 56 so that the reactant freely passes thereby. An identical result occurs in the valving device for the second reactant.

Although the invention has been described in terms of a ball check valve, other check valves responsive to the fluid pressure of the reactants flowing through the system, such as poppet valves, spring loaded poppet valves, spring loaded ball valves, disc valves, spring loaded disc valves, flapper valves, and spring loaded flapper valves, may be used.

It is apparent from the foregoing description that an improved valving device free from manual operation has been provided for a stopped flow system. In addition, the valve housings, detachable valve bodies, and the balls used therein are easily manufactured since they do not require close tolerances. Also, the large allowable tolerances enables parts to be constructed of a nonmetallic material, thereby avoiding metal contamination which can interfere with the study of such reactions as enzyme reactions. In addition, the valving device has no moving seals and, therefore, no dead spaces. Furthermore, the valving device requires relatively few flushing cycles with reagents to produce a repeatable stopped flow observation, an important feature to permit conservation of reactants.

I claim:

1. In an apparatus for rapidly filling an observation cell with reactants which have just been rapidly mixed including a plurality of reactant supply means, a plurality of reactant drive cylinders, each communicating with a reactant supply means and serving to drive the reactants therein to a mixer, a plurality of first valve means each one interposed between a set of supply means and drive cylinders, a plurality of second valve means each one interposed between one of the driving cylinders and the mixer, an observation cell in communication with the mixer, and means for allowing a predetermined volume of mixed reactants to flow through said cell and for instantaneously stopping further flow, the improvement comprising:

said first valve means including a one-way check valve for permitting reactant flow toward the drive cylinder and stopping reactant flow toward the supply means, the stoppage being responsive automatically to the fluid pressure of the reactant in the direction of the supply means; and the second valve means including a one-way check valve serving to permit reactant flow toward the mixer responsive automatically to reactant fluid pressure in that direction and to prevent reactant flow toward the drive cylinder.

2. An apparatus as in claim 1 wherein said first and second valve means are ball check valves.

3. An apparatus as in claim 2 wherein said second ball check valve is gravity-assisted in the prevention of reactant flow toward the drive cylinder.